United States Patent [19]
Higuma

[11] Patent Number: 6,128,443
[45] Date of Patent: *Oct. 3, 2000

[54] CAMERA AND INTERCHANGEABLE LENS

[75] Inventor: Kazuya Higuma, Funabashi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/986,938

[22] Filed: Dec. 8, 1997

[30] Foreign Application Priority Data

Dec. 11, 1996 [JP] Japan ................................. 8-346493
Dec. 27, 1996 [JP] Japan ................................. 8-358440

[51] Int. Cl.[7] .................................................. G03B 13/36
[52] U.S. Cl. ............................ 396/91; 396/137; 396/529
[58] Field of Search ............................... 396/91, 79–82, 396/529, 532, 71, 301, 302, 307, 137

[56] References Cited

U.S. PATENT DOCUMENTS 5,778,271  7/1998  Kawasaki et al. ...................... 396/532
5,832,313  11/1998  Ishibashi et al. ......................... 396/79

FOREIGN PATENT DOCUMENTS 6-3582  1/1994  Japan .

*Primary Examiner*—W. B. Perkey
*Attorney, Agent, or Firm*—Fitzpatrick, Cella, Harper & Scinto

[57] ABSTRACT

A camera which performs data communication with a mounted interchangeable lens includes a command generating circuit for generating a command which is not directly related to the data communication; and a control circuit for discontinuing the data communication with the mounted interchangeable lens when the command is generated while the data communication is being performed with the mounted interchangeable lens.

20 Claims, 8 Drawing Sheets

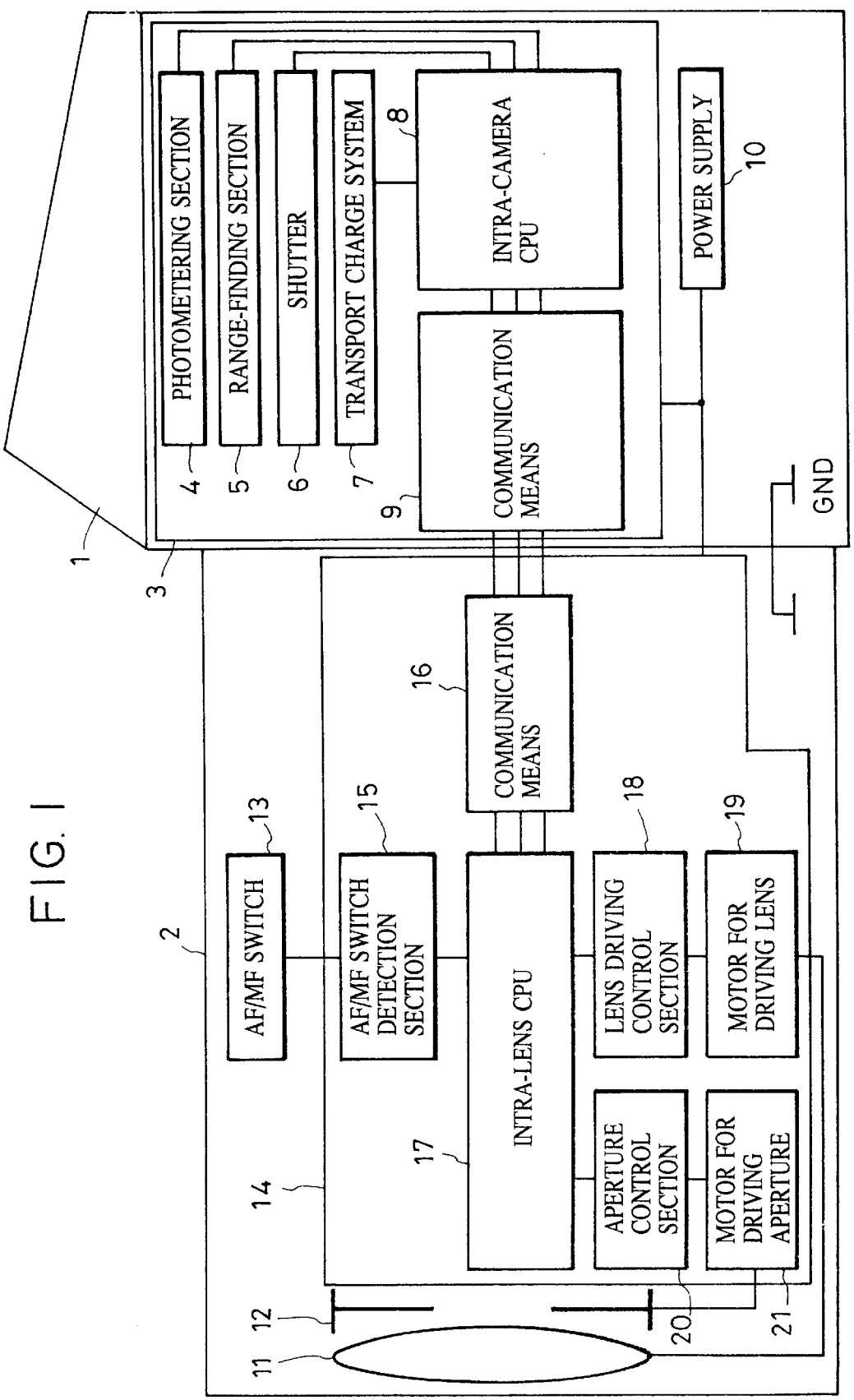

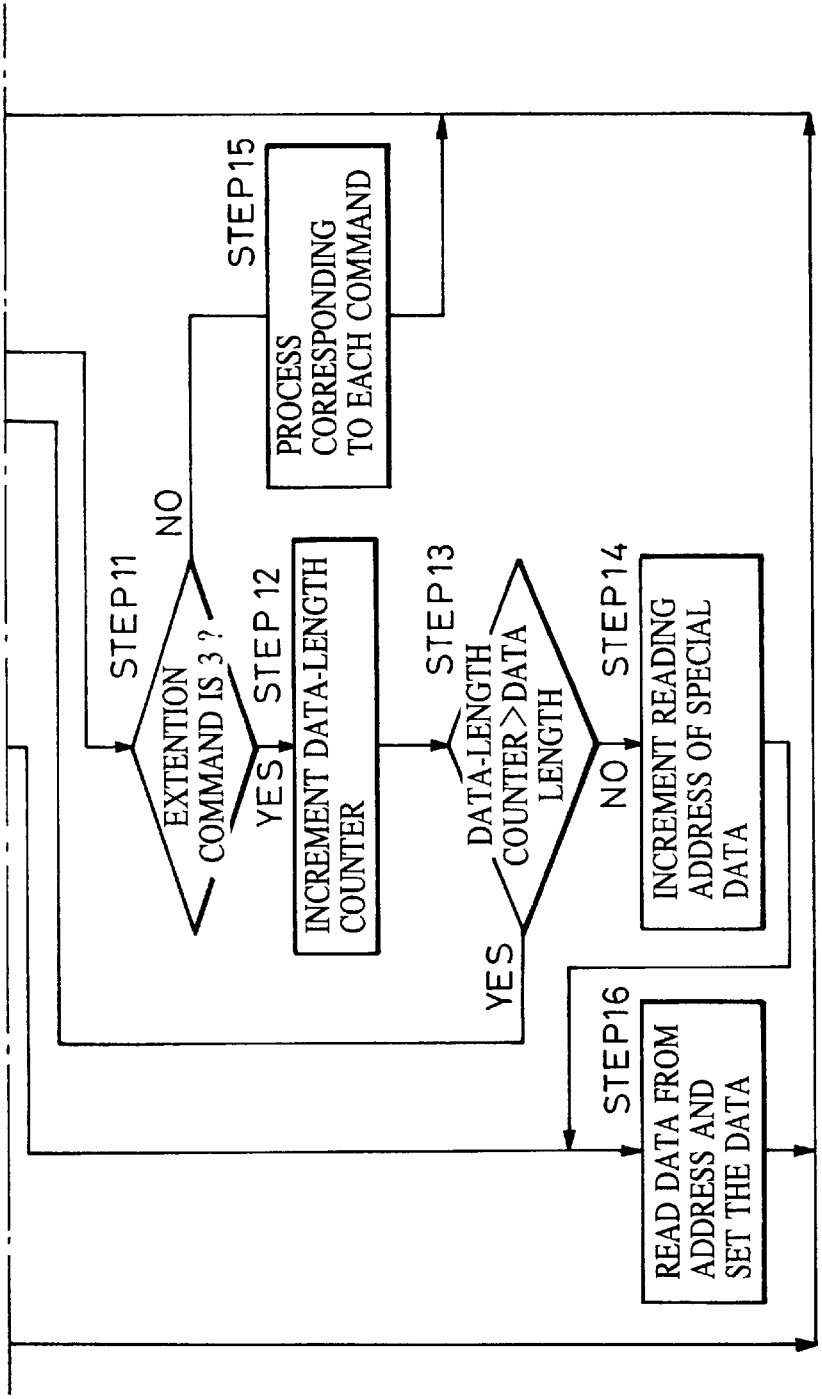

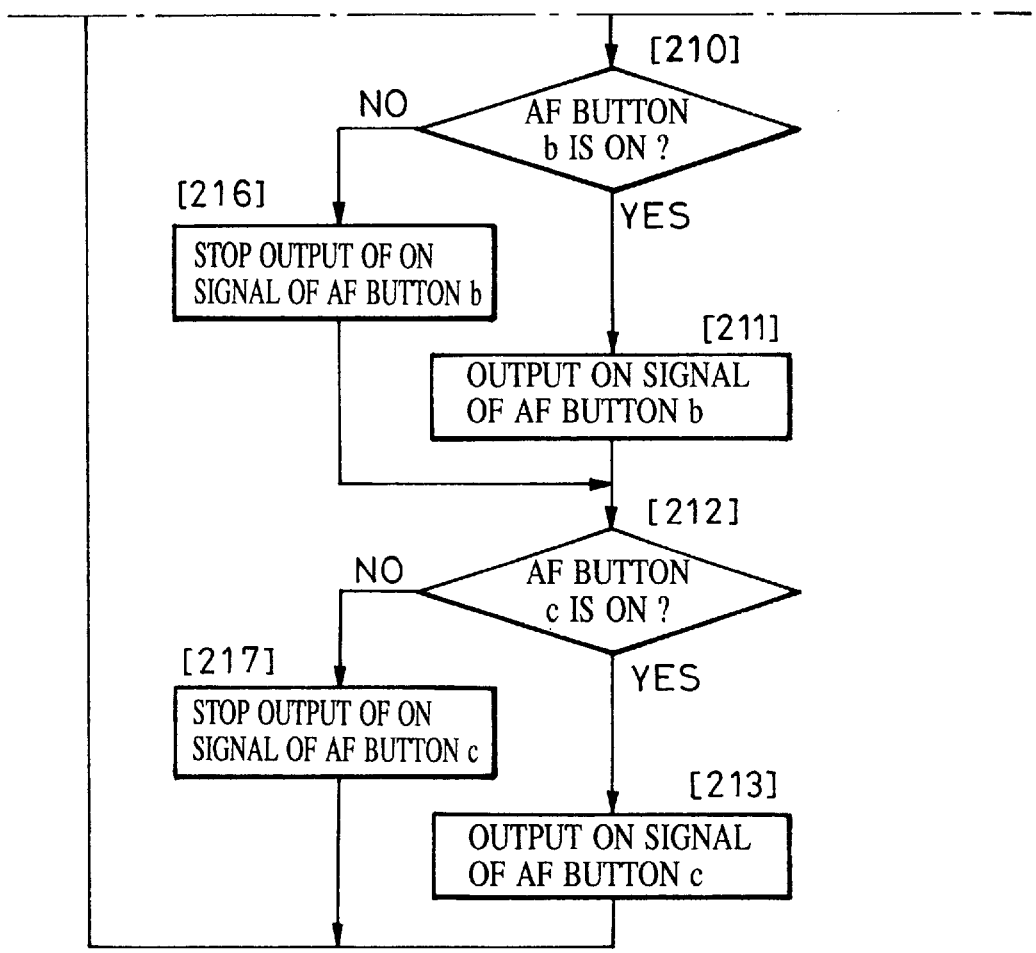

CAMERA AND INTERCHANGEABLE LENS

BACKGROUND OF THE INVENTION

1. Field of the Invention

The present invention relates to a camera system. More particularly, the present invention relates to a camera system which is suitable for communicating a variety of photographic information between a camera body and interchangeable lenses which are attached in such a way that they can be removed from the camera body or between a camera body and accessories mounted to the camera body, and which is suitable for performing photographic operations on the basis of the communicated information.

2. Description of the Related Art

Hitherto, as an information exchange communication method between a camera body used in a camera system in which interchangeable lenses or accessories can be removed from the camera body, and interchangeable lenses or accessories, often a serial communication method using a communication line, such as a clock line for synchronization, a data line for transmission, or a data line for reception, has been used.

More specifically, a command is transmitted from the camera body to the interchangeable lenses or the accessories. Based on this, the interchangeable lenses or the accessories recognize the command, and in response, data is transmitted from the interchangeable lenses or the accessories to the camera body. As described above, the conventional communication method between the camera body and the interchangeable lenses or the accessories is a one-way method. Such a camera system is disclosed in Japanese Patent Laid-Open No. 6-3582.

SUMMARY OF THE INVENTION

According to the present invention, in a camera which performs data communication with mounted interchangeable lenses, even while data communication is being performed with the mounted interchangeable lenses, when a command which is not directly related to data communication is generated, the data communication with the interchangeable lenses is discontinued. Therefore, a command which is not directly related to data communication can be accepted even during data communication.

The above and further objects, aspects and novel features of the invention will become more apparent from the following detailed description when read in connection with the accompanying drawings.

BRIEF DESCRIPTION OF THE DRAWINGS

FIG. 1 is a block diagram illustrating the electrical construction of a camera system according to a first embodiment of the present invention;

FIG. 2, including FIGS. 2A and 2B, is a flowchart illustrating the operation of the camera system according to the first embodiment of the present invention;

FIG. 6, including FIGS. 6A and 6B, is a flowchart illustrating the operation of the essential portion of the camera system shown in FIG. 5.

DESCRIPTION OF THE PREFERRED EMBODIMENTS

Figure 2A:
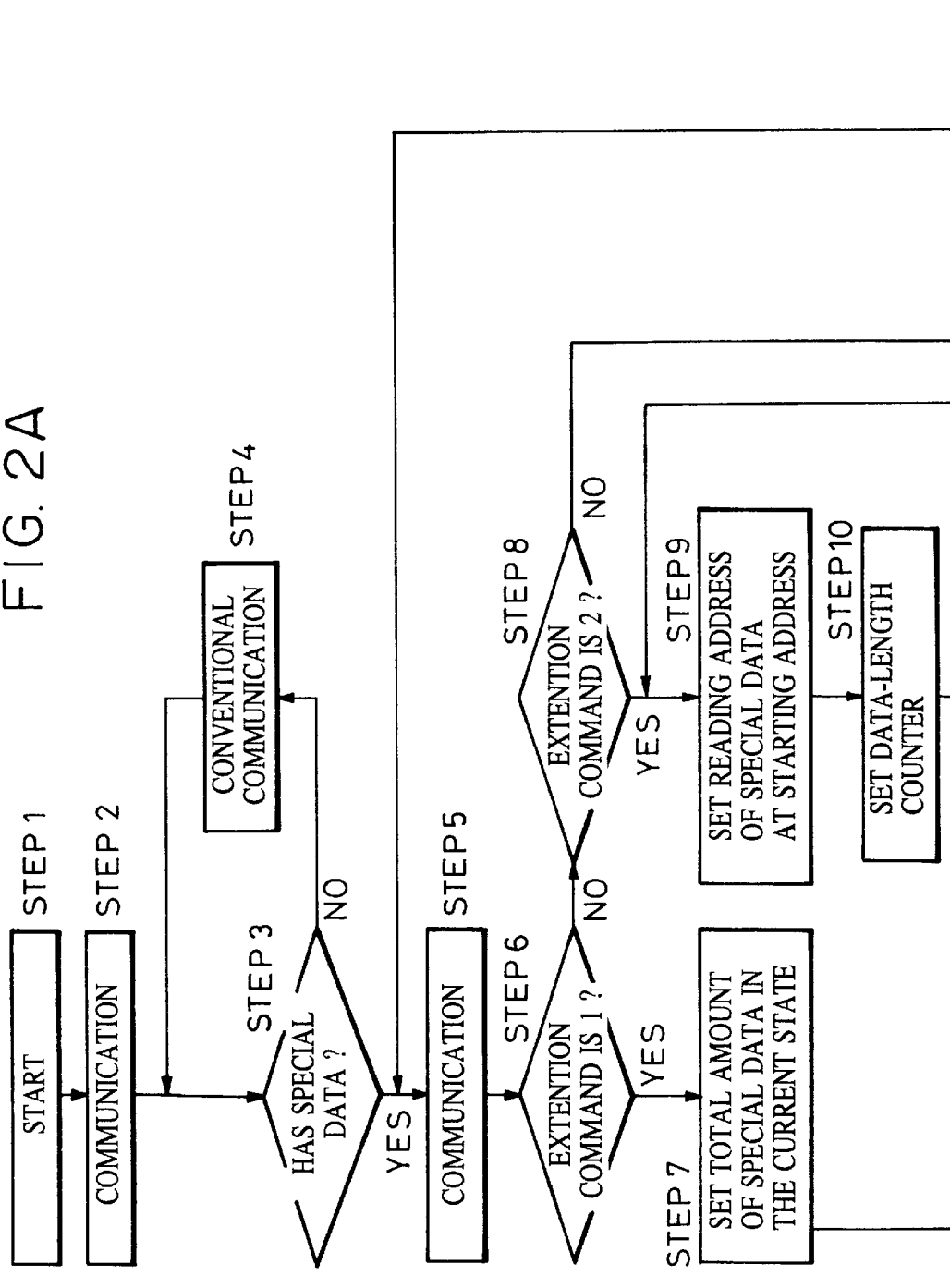

FIG. 1 is a block diagram illustrating the essential portion of a camera system according to a first embodiment of the present invention. Reference numeral 1 denotes a camera body. Incorporated within the camera body 1 is an intra-body electrical system 3 comprising a photometering section 4 for photometering a light beam which passes through a photographic lens, a range-finding section 5 for measuring the distance to a subject, a shutter 6 for providing an appropriate exposure time, a transport charge system 7 for winding and rewinding a film, and a microcomputer (intra-camera CPU) 8 on the camera side for controlling the starting, stopping, or the like, of these operations, and performing an exposure computation, an AF computation, and communications with lenses. Power is also supplied to the intra-body electrical system 3 from an intra-body power supply 10.

Reference numeral 9 denotes communication means provided on the camera body side, which comprises photographic lenses, for example, a single-focal-length lens and a zoom lens. Reference numeral 11 denotes a focusing lens which forms a part of the photographic lenses. Reference numeral 12 denotes an aperture provided within the photographic lens. Reference numeral 13 denotes an AF/MF switch for switching between auto-focus and manual focus. Reference numeral 14 denotes an electrical circuit section of an interchangeable lens 2.

Incorporated within the electrical circuit section 14 are an AF/MF switch detection section 15 for detecting the state of the AF/MF switch 13, communication means 16 for performing serial communications with the camera body 1, a microcomputer (intra-lens CPU) 17 on the lens side for performing control of the inside of the interchangeable lens 2, a lens driving control section 18 for performing driving control of the focusing lens 11, a lens driving motor 19 for driving the focusing lens 11, an aperture control section 20 for performing driving control of the aperture 12, an aperture driving motor 21 for driving the aperture 12, and others.

The intra-lens microcomputer 17 receiving a command through the communication means 9 and 16 from the microcomputer 8 within the camera body 1 causes the lens driving control section 18 and the aperture control section 20 to operate according to the command. Further, the intra-lens microcomputer 17 transmits the states (zoom position, focus position, aperture value, and so on) within the interchangeable lens 2, and information (the open aperture value, the focal distance, range-finding computation data, and so on) about the interchangeable lens to the intra-camera microcomputer 8 through the communication means 9 and 16. In this embodiment, communications are performed by serial communications of an 8-bit data synchronizing clock method.

The intra-camera microcomputer 8 transmits a command requesting the state and the information of the interchangeable lens 2 to the intra-lens microcomputer 17. In response, the intra-lens microcomputer 17 transmits the requested state and the information of the interchangeable lens 2 to the intra-lens microcomputer 17. The communication between the intra-camera microcomputer 8 and the intra-lens microcomputer 17 is the same as conventional communication.

Here, when the camera body has a new auto-focus function different from the conventional one, the intra-camera microcomputer 8 determines whether or not the mounted interchangeable lens is an interchangeable lens which corresponds to the new auto-focus function on the basis of the state and the information of the interchangeable lens 2 received from the intra-lens microcomputer 17. At this time, when the mounted interchangeable lens is an interchangeable lens which corresponds to the new auto-focus function, the intra-camera microcomputer 8 requests special data corresponding to the new auto-focus function from the intra-lens microcomputer 17. On the other hand, when the mounted interchangeable lens is not an interchangeable lens which corresponds to the new auto-focus function, the intra-camera microcomputer 8 does not request special data and performs conventional communication.

Further, when the camera body is a camera body which does not have the new auto-focus function, conventional communication is performed because it cannot be determined whether or not the mounted interchangeable lens is an interchangeable lens which corresponds to the new auto-focus function.

As a result of adopting the above-described communication method, a lens body to which a new auto-focus function is added and a conventional lens body to which a new auto-focus function is not added can be used while maintaining compatibility.

In this embodiment, an extension command for requesting special data is divided into three steps of extension commands 1, 2, and 3 described below. The extension command 1 is a command for requesting the total amount of special data. The interchangeable lens receiving this command transmits the total amount of special data in the current state to the camera body. The extension command 2 is a command for requesting the starting of the transmission of special data. The interchangeable lens receiving this command outputs data corresponding to the first unit of one data-length of the special data between the camera body and the interchangeable lens.

The extension command 3 is a command for requesting the continuation of the communication of the special data. The interchangeable lens receiving this command transmits special data in units of one data length in accordance with the predetermined sequence. When the communication of the amount of data transmitted with respect to the extension command 1 is terminated, output is made starting again with the first unit of one data-length.

The interchangeable lens does not need to continuously transmit extension data with respect to the extension command 2 or 3 and can receive another command during mid-processing.

Next, the operation of this embodiment will be described with reference to the flowchart of FIG. 2, including FIGS. 2A and 2B.

[Step 1]

The interchangeable lens 2 is attached to the camera body 1, and the process of the flow starts.

[Step 2]

The camera body 1 and the interchangeable lens 2 start 8-bit serial communication via the communication means 9 and 16. A serial clock (not shown) is supplied from the camera body 1. A command is transmitted from the camera body 1 to the interchangeable lens 2 in synchronization with the serial clock. Data for the received command is transmitted from the interchangeable lens 2 to the camera body 1.

Communication herein is performed by commands and data in the same manner as previous convention. When the interchangeable lens 2 is an interchangeable lens capable of handling the new auto-focus function, a signal indicating that there is special data is transmitted to the intra-camera microcomputer 8 of the camera body. For the signal indicating that there is special data, a bit which is not defined is used in the data that the interchangeable lens which does not correspond to the new auto-focus function transmits. As a result of the above, there is no problem with the combination of a camera body which does not correspond to the new auto-focus function and an interchangeable lens which corresponds to the new auto-focus function. Conversely, the combination of a camera body which corresponds to the new auto-focus function and an interchangeable lens which does not correspond to the new auto-focus function can be used without any problems.

[Step 3]

When the camera body 1 having the new auto-focus function recognizes that the interchangeable lens 2 has special data, the process proceeds to step 5. When the camera body 1 recognizes that the interchangeable lens 2 does not have special data, the process proceeds to step 4.

[Step 4]

When the interchangeable lens 2 does not have special data, conventional communication is performed.

[Step 5]

When both the camera body 1 and the interchangeable lens 2 correspond to the new auto-focus function, one of the extension commands 1, 2, and 3 is transmitted from the camera body 1 to the interchangeable lens 2. The interchangeable lens 2 transmits data corresponding to the received extension command to the camera body 1.

[Step 6]

If the extension command transmitted from the camera body 1 to the interchangeable lens 2 is extension command 1 in step 5, the process proceeds to step 7. If it is not extension command 1, the process proceeds to step 8.

The extension command 1 is a command for requesting the total amount of special data. The interchangeable lens 2 receiving this command transmits the total amount of special data to the camera body 1.

[Step 7]

The interchangeable lens 2 reads the position of the zoom lens, the position of the focusing lens along the optical axis, and the like, and sets the total amount of special data in the current state in a serial buffer, this data being transmitted to the camera body 1 at the next communication.

[Step 8]

If the extension command transmitted from the camera body 1 to the interchangeable lens 2 is extension command 2 in step 5, the process proceeds to step 9. If it is not extension command 2, the process proceeds to step 11.

The extension command 2 is a command for requesting the start of the transmission of special data. The interchangeable lens 2 receiving this command outputs data corresponding to the first unit of one data-length of the special data to the camera body 1.

[Step 9]

The camera body 1 sets the data address for reading special data at the starting address.

[Step 10]

A data-length counter for determining whether or not the camera body 1 has received all the special data is reset.

[Step 11]

If the extension command transmitted from the camera body 1 to the interchangeable lens 2 is extension command 3 in step 5, the process proceeds to step 12. If it is not extension command 3, the process proceeds to step 15.

The extension command 3 is a command for requesting the continuation of the transmission of the special data. The interchangeable lens 2 receiving this command transmits special data in units of one data length in accordance with the predetermined sequence.

[Step 12]

In order to count the number of bytes of the special data received by the camera body 1, the data-length counter is incremented.

[Step 13]

The total amount of data returned in response to extension command 1 is compared with the value of the data-length counter. When the value of the data-length counter is greater, the process proceeds to step 9. When the value of the data-length counter is smaller, the process proceeds to step 14.

[Step 14]

The camera body 1 increments the data address for reading the special data by 1 from the current value.

[Step 15]

When the command transmitted from the camera body 1 to the interchangeable lens 2 is none of the extension commands 1, 2, and 3, even if the special data is being transmitted, this is stopped, and a process corresponding to the received command is performed.

When the process corresponding to the received command is terminated, the process returns to step 5 again where extension command 3 is received, and the transmission of the special data is continued.

[Step 16]

Data is read from the data address which is set at the starting address in step 9. The data is set in the serial buffer in order that the data is transmitted to the camera body 1 at the next communication. Then, the process returns to step 5 where the next communication is awaited.

Figure 3:
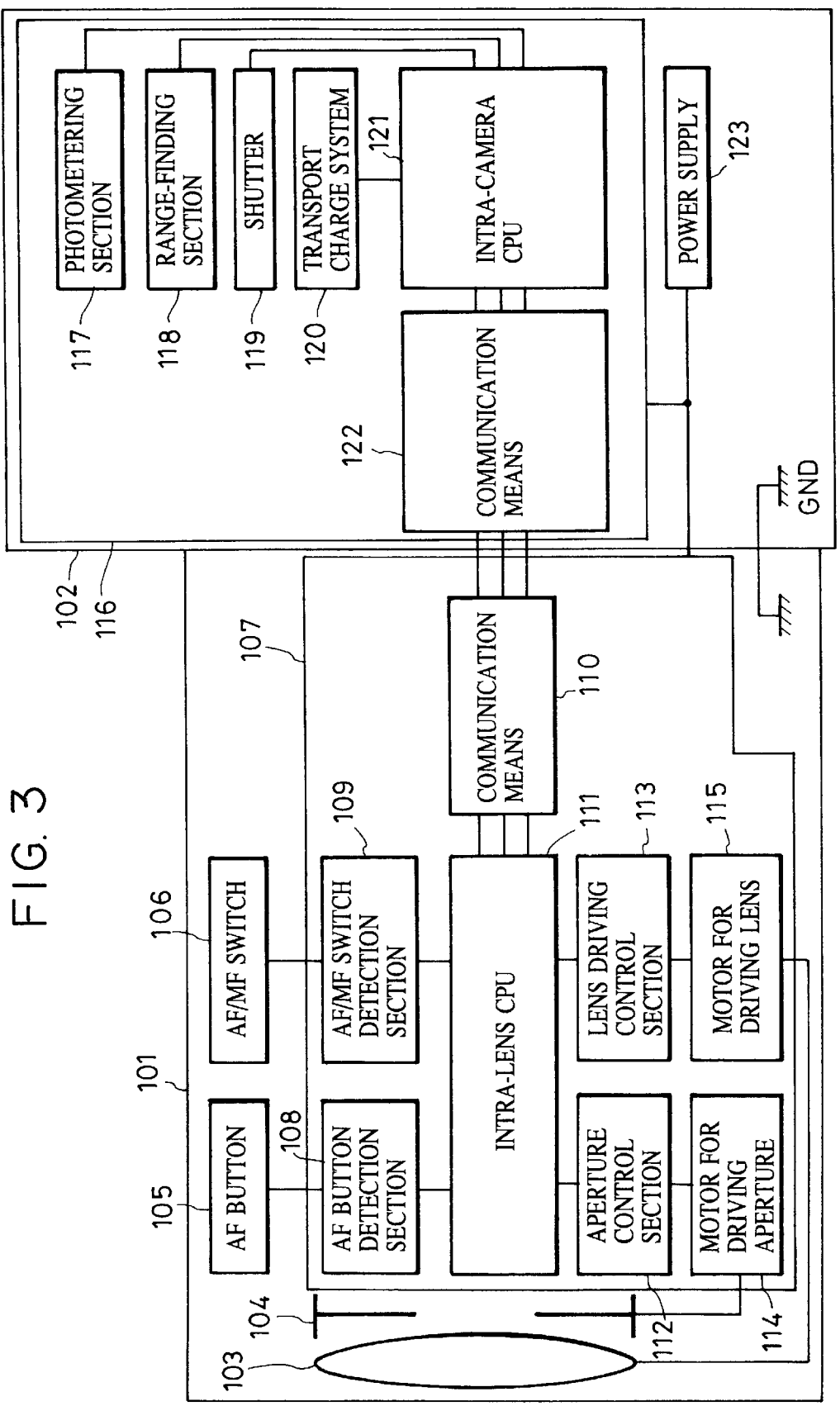
FIG. 3 is a block diagram illustrating the electrical construction of a camera system according to a second embodiment of the present invention.

FIG. 3 is a block diagram illustrating the electrical construction of a camera system according to a second embodiment of the present invention. Reference numeral 101 denotes a lens (interchangeable lens) in the camera system. Reference numeral 102 denotes a camera (camera body).

The construction of the lens 101 will be described first. Shown in FIG. 3 are a focusing lens 103, an aperture 104, an auto-focus button (hereinafter referred to as an AF button) 105, an AF/MF switch 106, and an electrical circuit section 107 within the lens 101. Provided within the electrical circuit section 107 are an AF-button detection section 108 for detecting the state of the AF button 105, an AF/MF switch detection section 109 for detecting the state of the AF/MF switch 106, communication means 110 for performing serial communication with the camera 102, an intra-lens CPU 111 for performing various control of the inside of the lens 101, an aperture control section 112 for performing driving control of the aperture 104, a lens driving control section 113 for performing driving control of the focusing lens 103, an aperture driving motor 114 for driving the aperture 104, and a lens driving motor 115 for driving the focusing lens 103.

Next, the construction of the camera 102 will be described. Reference numeral 116 denotes an electrical circuit section within the camera 102. Provided within the electrical circuit section 116 are a photometering section 117 for photometering the amount of light which passes through the lens 101, a range-finding section 118 for measuring the distance from the film surface (not shown) to a subject, a shutter 119 for causing a film to be exposed for an appropriate length of time, a transport charge system 120 for winding and rewinding a film, an intra-camera CPU 121 for performing various control of the inside of the camera, and communication means 122 for performing serial communication with the lens 101. Further, a power supply 123 required as a power source for the lens 101 is also provided inside the camera 102.

Figure 4:
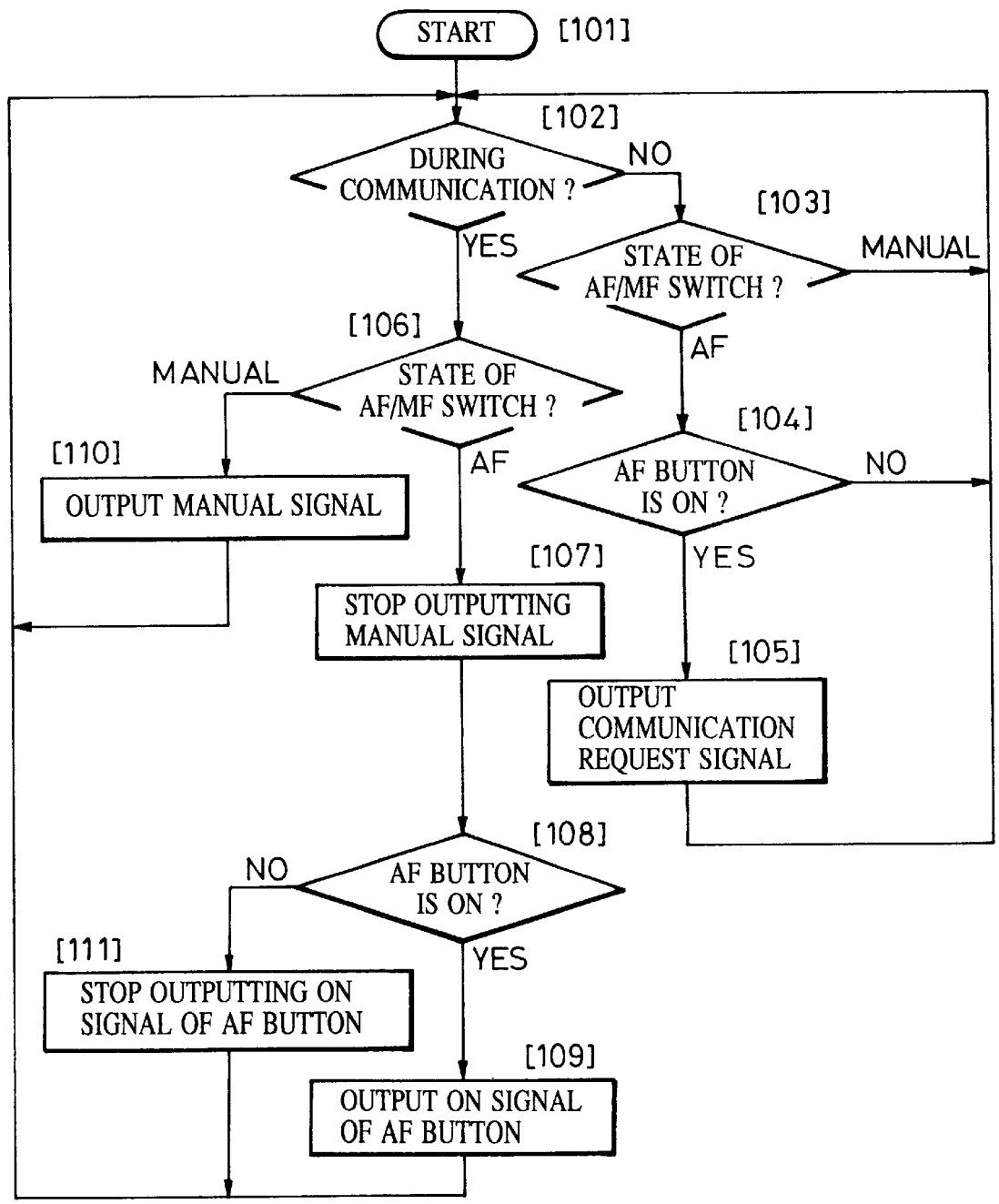
FIG. 4 is a flowchart illustrating the operation of the essential portion of the camera system shown in FIG. 3.

Next, with reference to the flowchart of FIG. 4, a description will be given of the operation (here, the operation within the intra-lens CPU 111) of the essential portion of the camera system constructed as described above.

[Step 101]

The lens 101 is attached to the camera 102, and the power supply is switched on. Thereupon, the operation beginning with step 102 in FIG. 4 is started.

[Step 102]

A check is made to determine whether or not serial communication is being performed between the camera and the lens. When the serial communication is being performed, the process proceeds to step 106. When the serial communication is not being performed, the process proceeds to step 103. The case in which communication is not being performed refers to, for example, a case in which neither the camera 102 nor the lens 101 is being operated for a particular length of time and the camera system enters a power saving mode for preventing the consumption of the battery.

Here, assuming that communication is not being performed, a description of step 103 and subsequent steps will be given first.

[Step 103]

The state of the AF/MF switch 106 provided within the lens 101 is detected. If in manual-focus state, the process returns to step 102. If in auto-focus state, the process proceeds to step 104.

[Step 104]

The state of the AF button 105 provided in the lens 101 is detected. If the AF button 105 is on, the process proceeds to step 105. If the AF button 105 is off, the process returns to step 102.

[Step 105]

A communication request signal is output to the camera 102 so as to start communication.

The camera 102, upon receiving the above communication request signal, recognizes that the state of the lens 101 is changed and starts communication.

When it is determined in step 102 described above that communication is being performed, the process proceeds to step 106 in the above-described manner.

[Step 106]

The state of the AF/MF switch 106 provided within the lens 101 is detected. If in manual-focus state, the process proceeds to step 110. If in auto-focus state, the process proceeds to step 107.

[Step 107]

Here, since the AF/MF switch 106 is in the auto-focus state, the output of the manual-focus signal to the camera 102 is stopped.

As a result, the camera 102 determines that the AF/MF switch 106 is set to auto-focus because the manual-focus signal is not output, and enters an auto-focus controllable state.

[Step 108]

The state of the AF button 105 provided in the lens 101 is detected. If the AF button 105 is on, the process proceeds to step 109. If the AF button 105 is off, the process proceeds to step 111.

[Step 109]

The on signal of the AF button 105 is output to the camera.

The camera 102 receiving the on signal of the AF button 105 recognizes that the AF button 105 of the lens 101 is being pressed and performs auto-focus control.

[Step 110]

Here, since the AF/MF switch 106 is in the manual-focus state, a manual-focus signal is output to the camera 102.

As a result, receiving the manual-focus signal, the camera 102 determines that the AF/MF switch 106 is set to manual focus and does not perform auto-focus control.

[Step 111]

Here, since the AF button 105 is off, the output of the on signal of the AF button 105 to the camera 102 is stopped.

As a result, the camera 102 recognizes that the AF button 105 of the lens 101 is turned off and stops the auto-focus control.

As described above, by operating the AF button 105 of the lens 101, the starting and stopping of auto-focus can be performed. Thus, a camera system with high ease of use can be realized.

Figure 5:
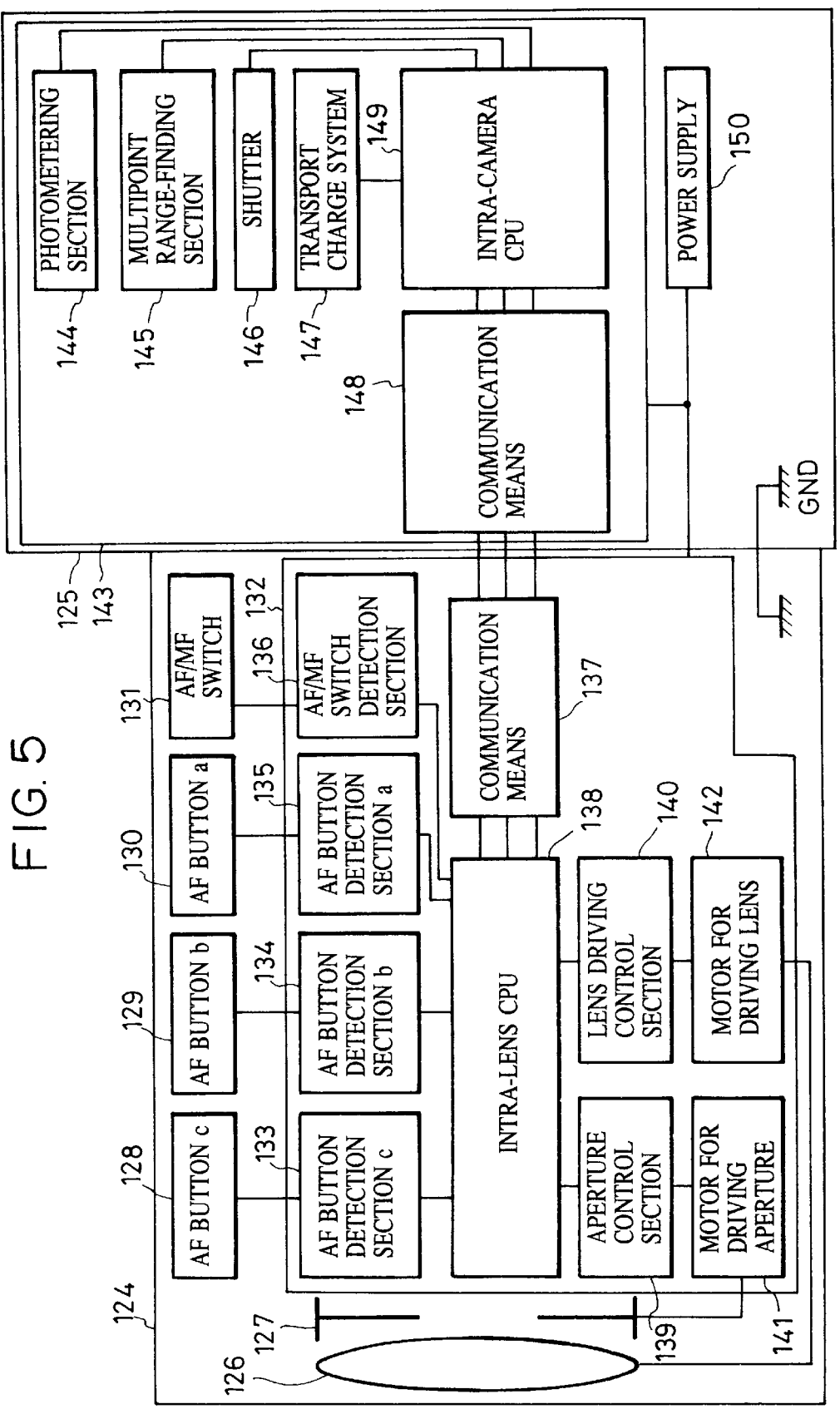
FIG. 5 is a block diagram illustrating the electrical construction of a camera system according to a third embodiment of the present invention.

FIG. 5 is a block diagram illustrating the electrical construction of a camera system according to a third embodiment of the present invention. Reference numeral 124 denotes a lens in the camera system. Reference numeral 125 denotes a camera.

The construction of the lens 124 will be described first. Reference numeral 126 denotes a focusing lens. Reference numeral 127 denotes an aperture. Reference numerals 128, 129, and 130 each denotes an AF button. Reference numeral 131 denotes an AF/MF switch for switching between auto-focus and manual focus. Reference numeral 132 denotes an electrical circuit section within the lens 124. Provided within the electrical circuit section 132 are AF-button detection sections 133 to 135 for detecting the state of the AF buttons 128 to 130, respectively, an AF/MF switch detection section 136 for detecting the state of the AF/MF switch 131, communication means 137 for performing serial communication with the camera 125, an intra-lens CPU 138 for performing various control of the inside of the lens 124, an aperture control section 139 for performing driving control of the aperture 127, a lens driving control section 140 for performing driving control of the focusing lens 126, an aperture driving motor 114 for driving the aperture 104, and a lens driving motor 142 for driving the focusing lens 126.

Next, the construction of the camera 125 will be described. Reference numeral 143 denotes an electrical circuit section within the camera 125. Provided within the electrical circuit section 143 are a photometering section 144 for photometering the amount of light which passes through the lens 124, a multipoint range-finding section 145 having a plurality of range-finding sections for measuring the distance from the film surface (not shown) to a subject, a shutter 146 for causing a film to be exposed for an appropriate length of time, a transport charge system 147 for winding and rewinding a film, an intra-camera CPU 149 for performing various control of the inside of the camera, and a communication means 148 for performing serial communication with the lens 124. Further, a power supply 150 required as a power source for the lens 124 is also provided inside the camera 125.

In this embodiment, a case in which three switches and three switch detection means corresponding to the three switches are provided in the lens 124, and in which there are three range-finding points of the camera 125 will be described.

The three switches are denoted as an AF button a (130 in FIG. 5), an AF button b (129 in FIG. 5), and an AF button c (128 in FIG. 5), respectively. The switch detection means corresponding to these buttons are denoted as an AF-button detection section a (135 in FIG. 5), an AF-button detection section b (134 in FIG. 5), and an AF-button detection section c (133 in FIG. 5), respectively. The three range-finding points (not shown) on the camera side are denoted as a range-finding point a, a range-finding point b, and a range-finding point c, respectively.

Next, referring to the flowchart of FIG. 6, the operation (the operation by the CPU 138) of the essential portion of the camera system constructed as described above will be described.

[Step 201]

Figure 6A:
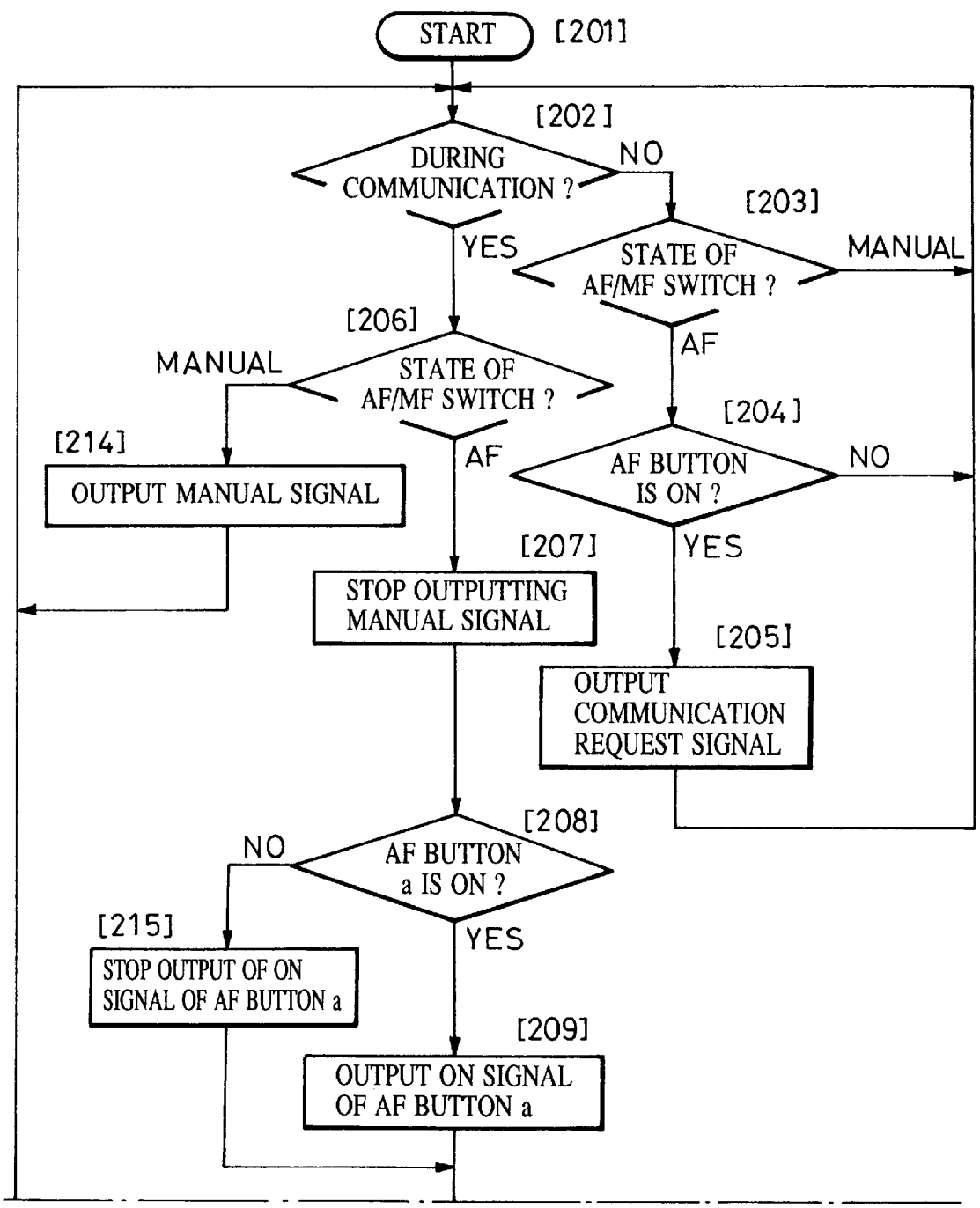

The lens 124 is attached to the camera 125, and the power supply is switched on. Thereupon, the operation beginning with step 202 in FIG. 6A is started.

[Step 202]

When serial communication between the camera and the lens is being performed, the process proceeds to step 206. When serial communication is not being performed, the process proceeds to step 203. The case in which communication is not being performed refers to, for example, a case in which neither the camera 125 nor the lens 124 is being operated for a particular length of time and the camera system enters a power saving mode for preventing the consumption of the battery.

Here, assuming that communication is not being performed, a description of step 203 and subsequent steps will be given first.

[Step 203]

The state of the AF/MF switch 131 provided within the lens 124 is detected. If in manual-focus state, the process returns to step 202. If in auto-focus state, the process proceeds to step 204.

[Step 204]

The states of all the AF buttons provided in the lens 124 are detected. If any one of them is on, the process proceeds to step 205. If all the AF buttons are off, the process returns to step 202.

[Step 205]

A communication request signal is output to the camera 125 so as to start communication.

The camera 125 receiving the above communication request signal recognizes that the state of the lens 124 is changed and starts communication.

When it is determined in step 202 described above that communication is being performed, the process proceeds to step 206 in the above-described manner.

[Step 206]

The state of the AF/MF switch 131 provided within the lens 124 is detected. If in manual-focus state, the process proceeds to step 214. If in auto-focus state, the process proceeds to step 207.

[Step 207]

Here, since the AF/MF switch 131 is in the auto-focus state, the output of the manual-focus signal to the camera 125 is stopped.

As a result, the camera 125 determines that the AF/MF switch 131 is set to auto-focus because the manual-focus signal is not output, and enters an auto-focus controllable state.

[Step 208]

The state of the AF button a provided in the lens 124 is detected. If the AF button a is on, the process proceeds to step 209. If the AF button a is off, the process proceeds to step 215.

[Step 209]

Here, since the AF button a is on, the on signal of the AF button a is output to the camera 125.

The camera 125 receiving the on signal of the AF button a recognizes that the AF button a of the lens 124 is being pressed, selects a range-finding point a corresponding to the AF button a, and performs auto-focus control.

[Step 210]

The state of the AF button b provided in the lens 124 is detected. If the AF button b is on, the process proceeds to step 210. If the AF button b is off, the process proceeds to step 216.

[Step 211]

Here, since the AF button b is on, the on signal of the AF button b is output to the camera 125.

The camera 125 receiving the on signal of the AF button b recognizes that the AF button b of the lens 124 is being pressed, selects a range-finding point b corresponding to the AF button b, and performs auto-focus control.

[Step 212]

The state of the AF button c provided in the lens 124 is detected. If the AF button c is on, the process proceeds to step 213. If the AF button c is off, the process proceeds to step 217.

[Step 213]

Here, since the AF button c is on, the on signal of the AF button c is output to the camera 125.

The camera 125 receiving the on signal of the AF button c recognizes that the AF button c of the lens 124 is being pressed, selects a range-finding point c corresponding to the AF button c, and performs auto-focus control.

[Step 214]

Here, since the AF/MF switch 131 is in the manual-focus state, the manual-focus signal is output to the camera 125.

As a result, the camera 125 receiving the manual-focus signal determines that the AF/MF switch 131 of the lens 124 is set to manual focus, and does not perform auto-focus control.

[Step 215]

Here, since the AF button a is off, the output of the on signal of the AF button a to the camera 125 is stopped.

As a result, the camera 125 recognizes that the AF button a of the lens 124 is turned off and stops the auto-focus control at the range-finding point a.

[Step 216]

Here, since the AF button b is off, the output of the on signal of the AF button b to the camera 125 is stopped.

As a result, the camera 125 recognizes that the AF button b of the lens 124 is turned off and stops the auto-focus control at the range-finding point b.

[Step 217]

Here, since the AF button c is off, the output of the on signal of the AF button c to the camera 125 is stopped.

As a result, the camera 125 recognizes that the AF button c of the lens 124 is turned off and stops the auto-focus control at the range-finding point c.

Further, when the camera 125 receives the on signal of a plurality of AF buttons, the camera 125 automatically selects the most appropriate range-finding point from among the plurality of range-finding points corresponding to these signals and performs auto-focus control.

As described above, in the combination with a multipoint range-finding camera, by operating the AF button corresponding to the range-finding point, the selection of a desired range-finding point can be made easily and reliably.

According to each of the above-described embodiments, by turning on an AF button provided in the lens, the camera starts auto-focus. Therefore, even when a release button is set to only a release function, ease of use is improved.

Further, when the release button is set to only a release function, since the auto-focus operates only when the AF button of the lens is on, focus-locked-like use is possible.

Furthermore, as in the third embodiment, since a plurality of AF buttons are made to correspond to the range-finding points of the multipoint range-finding camera, a complex operation needs not to be performed, and a desired range-finding point can be selected quickly.

In addition, when a plurality of AF buttons are being pressed simultaneously, the camera automatically selects the most appropriate range-finding point from among the plurality of selected range-finding points and performs auto-focus control. Therefore, quick and reliable auto-focus becomes possible in any case.

[Modification]

Although each of the above-described embodiments describes the case of an application to a single-lens reflex camera, the present invention is not limited to this case and can be applied to, for example, an interchangeable-lens-type video camera.

Although in each of the above-described embodiments an example is described in which the camera comprises a range-finding section for measuring the distance from the film surface to a subject and drives a lens on the basis of the range-finding information obtained thereby, it is a matter of course that, in place of the range-finding section, a focal-point detection section (for example, the amount of defocus of the subject is detected at each of a plurality of focal-point detection points, and the amount of defocus is determined in accordance with a predetermined algorithm) may be provided so that the lens is driven on the basis of the obtained defocus.

Further, although not particularly described in each of the above-described embodiments, the release button provided in the camera is assumed to have both an auto-focus function and a release function similar to a conventional single-lens reflex camera and can be changed by switching the mode so that the release button is made to have only the release function and the AF button 105 of FIG. 3 is made to have an auto-focus function as in each of the above-described embodiments.

Furthermore, when the release button is switched to the mode in which it has both an auto-focus function and a release function, a switching function other than the auto-focus function is added to the AF button 105 of the lens 101, making it possible to reduce the number of switching means on the lens side (a reduction in the cost) and to eliminate limitations on design.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A camera which performs data communication with an interchangeable lens mounted on the camera, said camera comprising:
    a command signal generating circuit that generates a command signal which is not directly related to data communication with an interchangeable lens mounted on the camera; and
    a control circuit that interrupts data communication between the camera and an interchangeable lens mounted on the camera when said command signal generating circuit generates the command signal while data communication is being performed between the camera and the interchangeable lens mounted on the camera.

2. A camera according to claim 1, wherein when said control circuit interrupts data communication at a point of data communication in response to a command signal generated by said command signal generating circuit, said control circuit restarts the data communication at the same point of data communication after processing of the command signal is finished.

3. A camera which performs data communication with an interchangeable lens mounted on the camera, said camera comprising:
    a determination circuit that determines whether an interchangeable lens mounted on the camera has special data;
    an instruction circuit that instructs an interchangeable lens that contains special data to start data communication of the special data from the interchangeable lens to the camera when said determination circuit determines that an interchangeable lens mounted on the camera has special data;
    a command signal generating circuit that generates a command signal which is not directly related to data communication with an interchangeable lens; and
    a control circuit that interrupts data communication between the camera and an interchangeable lens mounted on the camera when a command signal which is not directly related to data communication between the camera and the interchangeable lens is generated during data communication between the camera and the interchangeable lens mounted on the camera.

4. A camera according to claim 3, wherein when said control circuit interrupts data communication at a point of data communication in response to the command signal generated by said command signal generating circuit, said control circuit restarts the data communication at the same point of data communication after processing of the command signal is finished.

5. A camera according to claim 3, wherein said instruction circuit instructs the interchangeable lens mounted on the camera to output information for the size of the special data and then instructs the interchangeable lens to start reading out the special data.

6. A camera according to claim 3, wherein said determination circuit determines whether an interchangeable lens has special data on the basis of an initial data communication performed between said camera and the interchangeable lens after the interchangeable lens is mounted on the camera.

7. A camera which performs data communication with an apparatus connected to the camera, said camera comprising:
    a command signal generating circuit that generates a command signal which is not directly related to data communication between the camera and the apparatus; and
    a control circuit that interrupts data communication between the camera and the apparatus when a command signal is generated while data communication is being performed between the camera and the apparatus.

8. A camera according to claim 7, wherein when said control circuit interrupts data communication between the camera and the apparatus at a point of data communication, said control circuit restarts the data communication at the same point of data communication after processing of the command signal which is not directly related to data communication is finished.

9. A camera which performs data communication with an apparatus connected to the camera, said camera comprising:
    a determination circuit that determines whether the apparatus connected to the camera has special data;
    an instruction circuit that instructs an apparatus that has special data to start communication of the special data from the apparatus to the camera when the apparatus initially is connected to the camera;
    a command signal generating circuit that generates a command signal which is not directly related to data communication between the camera and the apparatus; and
    a control circuit that interrupts data communication between the camera and the apparatus when a command signal is generated while the special data is being communicated from the apparatus to the camera.

10. A camera according to claim 9, wherein when said control circuit interrupts data communication between the camera and the apparatus, said control circuit restarts the data communication at the same point of data communication after processing of the command signal which is not directly related to the data communication is finished.

11. A camera according to claim 9, wherein said instruction circuit instructs the apparatus to output information for the size of the special data and then instructs the connected apparatus to start reading out the special data.

12. A camera according to claim 9, wherein said determination circuit determines whether the apparatus has special data on the basis of an initial data communication performed between said camera and the apparatus after the apparatus is connected to the camera.

13. An interchangeable lens which performs data communication with a camera body when mounted on the camera body, said interchangeable lens comprising:
    an operation member; and
    a transmission circuit that transmits a communication request signal to the camera body when said operation member is operated.

14. An interchangeable lens according to claim 13, wherein said operation member is a button for starting an auto-focus operation.

15. A camera having mounted thereon an interchangeable lens which transmits a communication request signal, said camera comprising:
    a communication control circuit which starts communication with the interchangeable lens upon receiving a communication request signal from the interchangeable lens.

16. An interchangeable lens according to claim 13, further comprising a detection circuit that detects an operation of said operation member.

17. A camera according to claim 15, wherein the interchangeable lens has a plurality of operation members for performing respective operations.

18. A camera according to claim 17, wherein said plurality of operation members includes buttons for starting a respective plurality of auto-focus operations.

19. A camera according to claim 3, wherein the special data determines a form of data communication between the camera and the interchangeable lens mounted on the camera.

20. A camera that performs data communication with an apparatus mountable on the camera, said camera comprising:

a command signal generating circuit that generates a command signal which is not related to data communication with an apparatus mountable on the camera; and a control circuit that interrupts data communication between the camera and an apparatus mounted on the camera when said command signal generating circuit generates the command signal while data communication is being performed between the camera and the apparatus mounted on the camera.

\* \* \* \* \*

UNITED STATES PATENT AND TRADEMARK OFFICE
CERTIFICATE OF CORRECTION

PATENT NO. : 6,128,443
DATED : October 3, 2000
INVENTOR(S): KAZUYA HIGUMA

It is certified that error appears in the above-identified patent and that said Letters Patent is hereby corrected as shown below:

<u>DRAWINGS</u>:

Fig. 2A, "EXTENTION" should read --EXTENSION--.

<u>DRAWINGS</u>:

Fig. 2B, "EXTENTION" should read --EXTENSION--.

Signed and Sealed this

Twenty-second Day of May, 2001

*Attest:*

NICHOLAS P. GODICI

*Attesting Officer*     *Acting Director of the United States Patent and Trademark Office*